March 14, 1950     J. O. AUSTIN     2,500,786
BABY BOTTLE CONTAINER

Filed April 25, 1947

Inventor
James O. Austin

By Clarence A. O'Brien
and Harvey B. Jacobson
Attorneys

Patented Mar. 14, 1950

2,500,786

UNITED STATES PATENT OFFICE 2,500,786

BABY BOTTLE CONTAINER

James O. Austin, Bluefield, Va.

Application April 25, 1947, Serial No. 743,967

1 Claim. (Cl. 215—13)

The present invention relates to an improved container which is expressly, but not necessarily, adapted to hold and protect a nursing bottle for use by an infant.

The principal object of the invention is to provide simple and inexpensive nursing bottle holder or container wherein same is made up of coacting body and cover sections and the sections, in turn, being made up of inner and outer complemental parts, certain parts being spaced apart to provide dead air spaces which, in turn, function to permit the container to serve somewhat in the capacity of a so-called vacuum bottle.

Another object of the invention is to structurally, functionally, and otherwise improve upon holders and containers such as have been proposed for use by others, this by providing a structure which is unusually economical, practical and such that, in use, it serves to amply shield and protect the bottle, keeping the contents of the bottle in satisfactory condition for safe use over periods of several hours' time.

Other objects and advantages will become more readily apparent from the following description of the accompanying illustrative drawings.

In the drawings, wherein like numerals are employed to designate like parts throughout the views.

Figure 1:
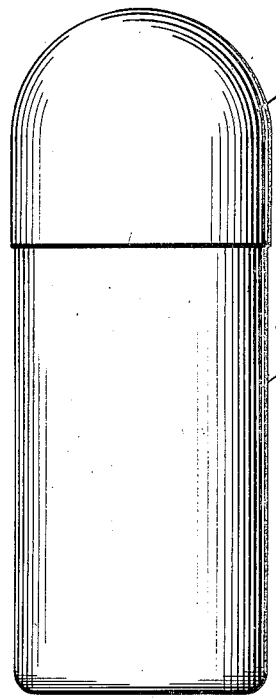
Figure 1 is a side elevational view of a nursing bottle container or holder constructed in accordance with the principles of the present invention.
Figure 2:
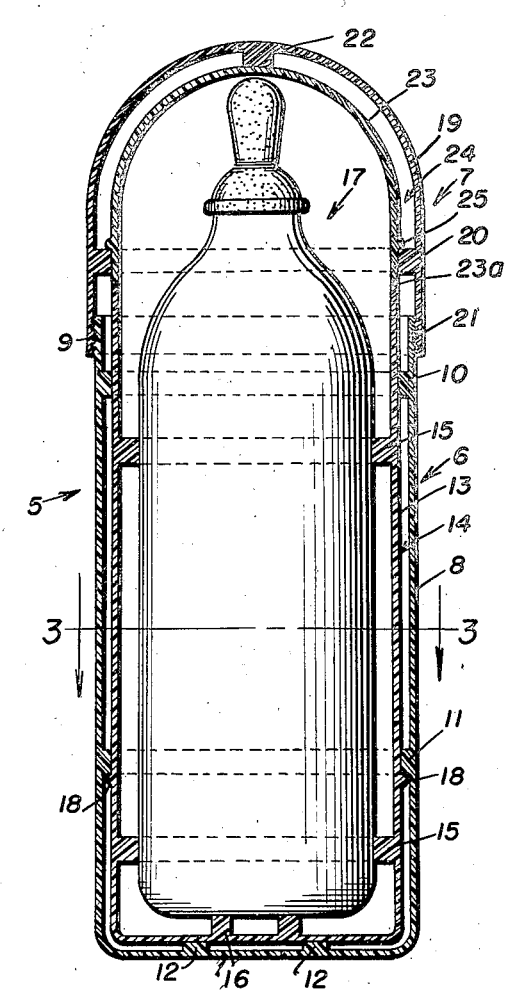
Figure 2 is an enlarged sectional view of the same.
Figure 3:
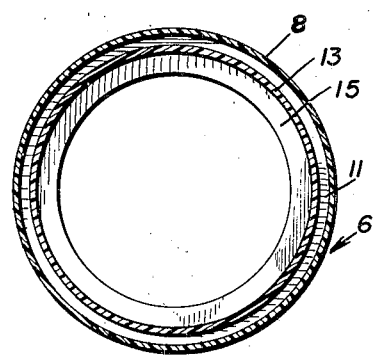
Figure 3 is a cross-sectional view on the plane of the line 3—3 of Figure 2, looking in the direction of the arrows.

Referring now to the drawings by distinguishing reference numerals, it will be seen that the container, as an improved unitary device, is denoted by the numeral 5 and that same is made up of complemental body and cap-like closure sections 6 and 7 respectively. The body section includes a cylindrical shell which is open at its top and which is denoted by the numeral 8 and screw-threaded at its upper end, as at 9, and is further internally provided with annular spacing ribs 10, 11 and additional spacing elements 12. This shell serves to pocket and adequately maintain in place an inner shell or lining 13 which is maintained in spaced relation to provide a dead-air chamber or space, as at 14. The inner shell is provided with internal ribs 15 and spacing elements 16 which serve to properly cushion and support the nursing bottle 17, this, as shown in Figure 2. The upper end-portion of the lining or shell is such that it protrudes above the threaded portion 9 of the outer shell. In addition, the outer surface of the inner shell is provided with suitable detents 18 which have removably snap relationship with the adjacent annular rib 11. The fact that the parts 8 and 13 are preferably made from slightly elastic material enables the inner part or shell to yield to provide the snap retention result just described. It follows that the inner shell can be removed from the outer shell, and both parts may be washed and reassembled, whereby to insure reasonable sanitation at all times.

The cover means 7 is also of sectional construction and comprises a main outer cap 19 which is provided with a spacing internal rib 20 and which is screw-threaded as at 21, to engage the aforementioned threads 9. A suitable spacing button or lug 22 is provided between the interior of the outer cap and the crown portion of the inner removable cap 23. Thus, the two caps are spaced apart to provide a dead-air space as at 24, and the inner cap is provided with detents 25 which engage the retaining and assembling rib 20.

It follows that both parts 6 and 7 of the container are made up of sections and the sections are connected releasably one with the other and serve to define dead-air spaces, which, in turn, produce the desired vacuum bottle effect.

I have found it expedient and practicable to construct the body and closure parts from coacting sections, providing ribs between the sections, in order to define the so-called vacuum or dead-air spaces. By employing plastic or equivalent stock and providing the inner members with simple detents, and arranging the detents to releasably engage the internal ribs, the sections which go to make up the respective parts are readily separable for assembling, repair and washing purposes.

It is submitted that even though the device is of unusual simplicity, it nevertheless provides a practical "vacuum" container for nursing bottles, thus keeping the bottle clean and sanitary and also preserving the contents of the bottle for practical utility by the owner.

Reference being had again to certain structural details, it will be noted that the upper end of the liner or shell 13 projects slightly above the correspondingly externally-threaded upper end of outer shell 8 and has a slightly rounded terminal edge. In fact, this extending portion of the liner projects up into the outer cap and the inner cap being shorter than the outer one has its lower edge formed with a groove. It follows that the two parts 13 and 23 fit together in tongue and groove fashion as denoted at 23a.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

I claim:

A vacuum-type nursing bottle container of the class shown and described comprising an elastic outer shell provided with internal ribs, an elastic inner shell provided with internal ribs, said inner shell being fitted telescopically in said outer shell and being in contact with said first-named ribs and thus providing a dead-air space between the respective shells, said inner shell having external detents and said detents being releasably engageable with one of said latter ribs, said inner shell being of a length appreciably greater than the length of said outer shell, and a cover for said container embodying an outer dome-like shell having its free edge portion screw-threaded and having an internal annular spacing rib, and a relatively small inner shell fitted in said outer shell and contacting said rib and being thus spaced from the interior surface of the outer shell to provide a dead-air space between the respective shells, said inner shell having detents releasably engageable with said spacing rib, and the screw-threaded edge portion of said outer shell projecting well beyond and wholly encompassing the corresponding edge portion of said inner shell.

JAMES O. AUSTIN.

REFERENCES CITED

The following references are of record in the file of this patent:

UNITED STATES PATENTS

| Number | Name | Date |
|---|---|---|
| 872,795 | Burger | Dec. 3, 1907 |
| 1,305,677 | Weed | June 3, 1919 |
| 1,325,859 | Phillips | Dec. 23, 1919 |

FOREIGN PATENTS

| Number | Country | Date |
|---|---|---|
| 76,234 | Sweden | Aug. 22, 1931 |
| 183,666 | Germany | Apr. 11, 1907 |